United States Patent
Mochida et al.

(10) Patent No.: US 11,876,609 B2
(45) Date of Patent: Jan. 16, 2024

(54) TIME SYNC DEVICE, TIME SYNC METHOD, AND PROGRAM

(71) Applicant: Nippon Telegraph and Telephone Corporation, Tokyo (JP)

(72) Inventors: Yasuhiro Mochida, Musashino (JP); Takahiro Yamaguchi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 40 days.

(21) Appl. No.: 17/627,843

(22) PCT Filed: Jul. 18, 2019

(86) PCT No.: PCT/JP2019/028343
§ 371 (c)(1),
(2) Date: Jan. 18, 2022

(87) PCT Pub. No.: WO2021/009923
PCT Pub. Date: Jan. 21, 2021

(65) Prior Publication Data
US 2022/0263593 A1    Aug. 18, 2022

(51) Int. Cl.
*H04J 3/06* (2006.01)
*H04W 56/00* (2009.01)

(52) U.S. Cl.
CPC ......... *H04J 3/0697* (2013.01); *H04W 56/001* (2013.01)

(58) Field of Classification Search
CPC ...... H04J 3/0635; H04J 3/0652; H04J 3/0658; H04J 3/0685; H04J 3/0694; H04J 3/0697; H04B 7/00; H04W 56/001
See application file for complete search history.

(56) References Cited

U.S. PATENT DOCUMENTS 8,064,485 B1 * 11/2011 Montini ............... H04J 3/0673
398/154
8,095,615 B2 * 1/2012 Briscoe ............... H04J 3/0682
331/18
(Continued)

FOREIGN PATENT DOCUMENTS

EP    2782290    9/2014
JP    2018125768    8/2018

OTHER PUBLICATIONS

[No Author Listed], "IEEE Standard for a Precision Clock Synchronization Protocol for Networked Measurement and Control Systems," IEEE Std 1588™-2008 (Revision of IEEE Std 1588-2002), Jul. 24, 2008, 289 pages.
(Continued)

*Primary Examiner* — Alpus Hsu
(74) *Attorney, Agent, or Firm* — Fish & Richardson P.C.

(57) ABSTRACT

A time synchronization device focuses on a possibility of multiplexing a plurality of PTP domains on a transmission line with the same PTP and derives one time based on time information from a plurality of PTP domains. The time synchronization device includes PTP slave units belonging to corresponding PTP domains different from each other and configured to synchronize with times of the corresponding PTP domains, and a time integration unit 12 configured to use time information that is a time after the PTP slave unit synchronizes with the time of a master device belonging to the corresponding PTP domain and synchronization accuracy information that is an accuracy of synchronization of the PTP slave unit with the time of the master device to generate one integrated time.

18 Claims, 6 Drawing Sheets

(56) References Cited

U.S. PATENT DOCUMENTS

| | | | |
|---|---|---|---|
| 8,416,763 B1* | 4/2013 | Montini | H04L 43/0858 |
| | | | 370/350 |
| 8,767,778 B2* | 7/2014 | Briscoe | H04N 21/242 |
| | | | 370/503 |
| 9,270,395 B2* | 2/2016 | Zheng | H04J 3/0667 |
| 9,547,332 B1* | 1/2017 | Mizrahi | H04J 3/0697 |
| 9,571,216 B2* | 2/2017 | Le Pallec | H04L 69/40 |
| 10,673,551 B2* | 6/2020 | Qiao | H04L 9/40 |
| 2017/0251508 A1 | 8/2017 | Park et al. | |
| 2017/0366287 A1* | 12/2017 | Zeng | H04J 3/0667 |
| 2019/0007151 A1* | 1/2019 | Goel | H04W 56/0015 |
| 2020/0280383 A1* | 9/2020 | Herber | H04J 3/0638 |
| 2021/0359778 A1* | 11/2021 | Wang | H04W 56/001 |

OTHER PUBLICATIONS

Mills et al., "Network Time Protocol Version 4: Protocol and Algorithms Specification," Internet Engineering Task Force (IETF), Request for Comments: 5905, Jun. 2010, 110 pages.

* cited by examiner

TIME SYNC DEVICE, TIME SYNC METHOD, AND PROGRAM

CROSS-REFERENCE TO RELATED APPLICATIONS

This application is a National Stage application under 35 U.S.C. § 371 of International Application No. PCT/JP2019/028343, having an International Filing Date of Jul. 18, 2019, the disclosure of which is considered part of the disclosure of this application, and is incorporated in its entirety into this application.

TECHNICAL FIELD

The present disclosure relates to a time synchronization device, a time synchronization method, and a program for time-synchronizing terminals connected by an Internet protocol (IP) network.

BACKGROUND ART

Inter-terminal time synchronization on the IP network is important for a variety of applications, such as task execution management and logging. In recent years, even in video transmission standards such as MPEG media transport (MMT) and SMPTE ST 2110, time synchronization between terminals is required. A method for time-synchronizing a terminal over an IP network includes a Network Time Protocol (NTP, see NPL 1), or a Precision Time Protocol (PTP, see NPL 2).

The NTP synchronizes the time of a client with that of a server by exchanging NTP packets including a timestamp between the server and the client. However, the NTP assumes that the delay time is the same for the outgoing and incoming NTP packets, and therefore is susceptible to delay jitter due to retention of the packets and the like in network devices (switches, routers, and the like) that transfer NTP packets.

The PTP is a protocol designed aiming at more accurate time synchronization than the NTP. By using hardware with the function to perform time stamping, it is possible to synchronize more accurately than the NTP. In the PTP, a plurality of slaves synchronize to a top master called a grand master (GM). An independent time synchronization group is formed for each PTP domain distinguished by a domain number field in the PTP packet header.

The GM is uniquely determined by best master clock algorithm (BMCA), which compares, for each PTP domain, predetermined priorities and synchronization states with time sources such as GPS, among a plurality of masters. Further, in the PTP, relay nodes called boundary clock (BC) and transparent clock (TC) are introduced. The BC is placed at the boundary of a network segment for the purpose of suppressing traffic increase and distributing the load of GM. The BC has a slave port that synchronizes with a higher master and a master port that delivers PTP packets to lower slaves. The BC behaves as a master for lower slaves and terminates PTP packets from the lower slaves. In addition, the TC is installed to correct residence time in network devices that has been a major error factor in the NTP. A network device operating as TC can correct the residence time in the TC to perform time stamping at the time of the input and output of the PTP packet.

CITATION LIST

Non Patent Literature

NPL 1: RFC 5905 (Network Time Protocol Version 4)

NPL 2: IEEE 1588-2008 (Standard for a Precision Clock Synchronization Protocol for Networked Measurement and Control Systems)

SUMMARY OF THE INVENTION

Technical Problem

Figure 1:
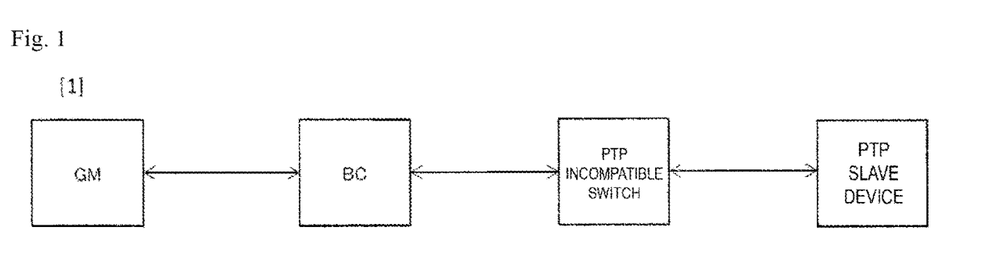
FIG. 1 is a diagram for describing a network in which PTP incompatible devices are mixed.

However, if a PTP packet passes through a PTP incompatible device, there is a risk that synchronization accuracy may be deteriorated due to the influence of the delay jitter. And, as the network becomes larger, it becomes more difficult to prepare devices compatible with the BC or the TC for all network devices. Therefore, there has been a problem that it is difficult to maintain synchronization accuracy of PTP in a network in which PTP incompatible devices are mixed as in FIG. 1.

Therefore, in order to solve the above-described problem, an object of the present invention is to provide a time synchronization device, a time synchronization method, and a program capable of improving time synchronization accuracy even in a network in which incompatible devices that are asynchronous with the time of the domain are mixed.

Means for Solving the Problem

In order to achieve the above-described object, a time synchronization device according to the present invention derives one time based on time information from a plurality of time synchronization groups.

Specifically, the time synchronization device according to the present invention includes slave units belonging to a plurality of corresponding domains with mutually independent time management and configured to synchronize with times of the plurality of corresponding domains, and a time integration unit configured to use time information that is a time after a slave unit of the slave units synchronizes with a time of a domain of the plurality of corresponding domains and synchronization accuracy information that is an accuracy of synchronization of the slave unit with the time of the domain to generate a single integrated time.

Further, a time synchronization method according to the present invention includes synchronizing, by slave units belonging to a plurality of corresponding domains with mutually independent time management, with times of the plurality of corresponding domains, and using time information that is a time after a slave unit of the slave units synchronizes with a time of a domain of the plurality of corresponding domains and synchronization accuracy information that is an accuracy of synchronization of the slave unit with the time of the domain to generate a single integrated time.

For example, the time synchronization device and the time synchronization method according to the present invention are characterized in that the domain is a precision time protocol (PIP) domain.

The time with which any domain is to be synchronized is the same and is typically coordinated universal time (UTC). However, due to the different paths that the time is delivered for each domain, the time the slave calculates is affected by different error factors for each domain. By using time information and synchronization accuracy information of a plurality of PIP domains, the present invention can obtain a time with higher accuracy than a time at which a single PTP domain has synchronized. For example, for the synchronization accuracy information, a variance of the time difference or a variance of one-way delay with a master of the PTP domain may be used. Further, the time integration unit may select one of a plurality of pieces of time information as the integrated time, or may calculate a weighted average of the plurality of pieces of time information and use as the integrated time.

Accordingly, the present invention can provide a time synchronization device and a time synchronization method that can improve time synchronization accuracy even in a network in which PTP incompatible devices are mixed.

The time synchronization device according to the present invention further includes a PTP master unit configured to synchronize a time of a device belonging to another PTP domain different from the PTP domain to which the PTP slave unit belongs, with the integrated time generated by the time integration unit.

The time synchronization device according to the present invention further includes a communication processing unit configured to operate in synchronization with the integrated time generated by the time integration unit.

The present invention provides a program for causing a computer to operate as the time synchronization device. A time synchronization device according to the present invention can also be implemented by a computer and a program, and the program can be recorded in a recording medium and provided through a network.

Effects of the Invention

The present invention can provide a time synchronization device, a time synchronization method, and a program capable of improving time synchronization accuracy even in a network in which incompatible devices that are asynchronous with the time of the domain are mixed.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings are assumed to be the same components.

First Embodiment

Figure 2:
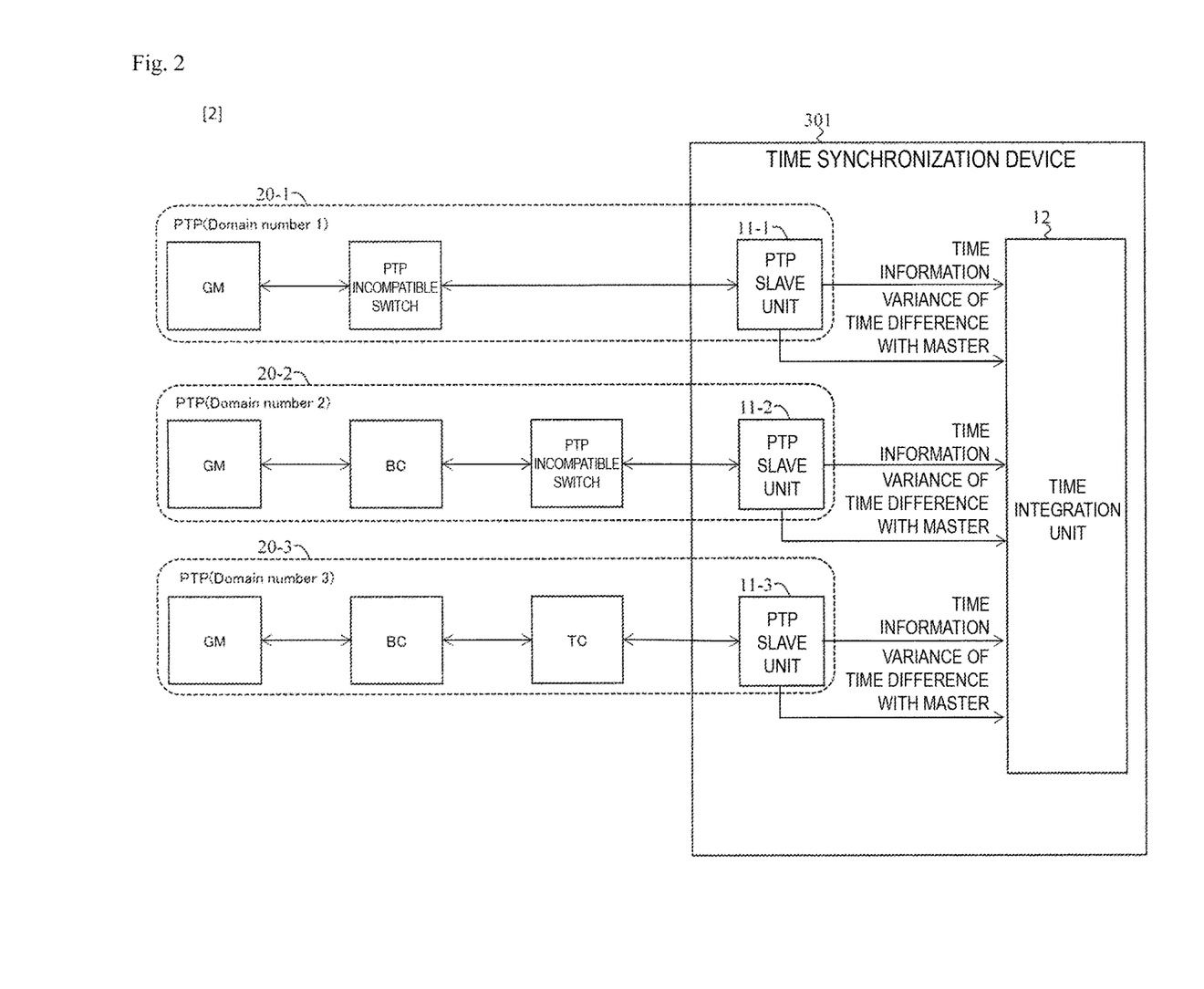
FIG. 2 is a diagram for describing a time synchronization device according to the present invention.

In the following embodiments, the case of PTP will be described, but the present invention is not limited to the PTP. FIG. 2 is a diagram describing a time synchronization device 301 according to the present embodiment. The time synchronization device 301 is a PTP slave device that can belong to a plurality of PTP domains. The time synchronization device 301 includes PTP slave units (20-1 to 3) belonging to corresponding PTP domains (11-1 to 3) different from each other and configured to synchronize with times of the corresponding PTP domains, and a time integration unit 12 configured to use time information that is a time after the PTP slave unit synchronizes with the time of a master device (GM or BC) belonging to the corresponding PTP domain and synchronization accuracy information that is an accuracy of synchronization of the PTP slave unit with the time of the master device to generate one integrated time.

The time synchronization device 301 increases the accuracy of integrated time by using, as synchronization accuracy information, variance of time difference between the time calibrated in the PTP slave unit 11 and the observed higher master device (GM or BC), and further taking into account synchronization accuracy information in a plurality of PTP domains. As an identifier for the domain, the domain number field in the PTP packet header is used.

The PTP slave unit 11 synchronizes with GM or BC that is the higher time source of the specified domain number and calibrates its own time. In the present embodiment, three PTP slave units (11-1 to 3) use domain numbers 1, 2, and 3, respectively. The PTP slave unit 11 transmits the calibrated time (time information) and the variance (synchronization accuracy information) of time difference between the calibrated time and the corresponding master to the time integration unit 12.

The time integration unit 12 uses the time information $t_i$ (i=1, 2, 3) and the variance $\sigma_i^2$ (i=1, 2, 3) of the time difference between the time information and the corresponding master, received from the plurality of PTP slave units (11-1 to 3) to generate a more accurate integrated time t by using, for example, the following equation.

[Math. 1]

$$t = \left(\sum_{i=1}^{n} \frac{t_i}{\sigma_i^2}\right) \Big/ \left(\sum_{i=1}^{n} \frac{1}{\sigma_i^2}\right) \quad (1)$$

Here, n=3.

As another simple example, the time integration unit 12 may employ the time of a PTP domain with the smallest variance of the time difference with the master device as the integrated time.

Note that in the present embodiment and the following embodiments, three PTP domains will be described, but the number of PTP domains is not limited to three. For example, when the number of PTP domains is n (n is a natural number equal to or more than 2), it is only required to be calculated by substituting the number of PTP domains for n, and the domain number for i in Equation (1).

Second Embodiment

Figure 3:
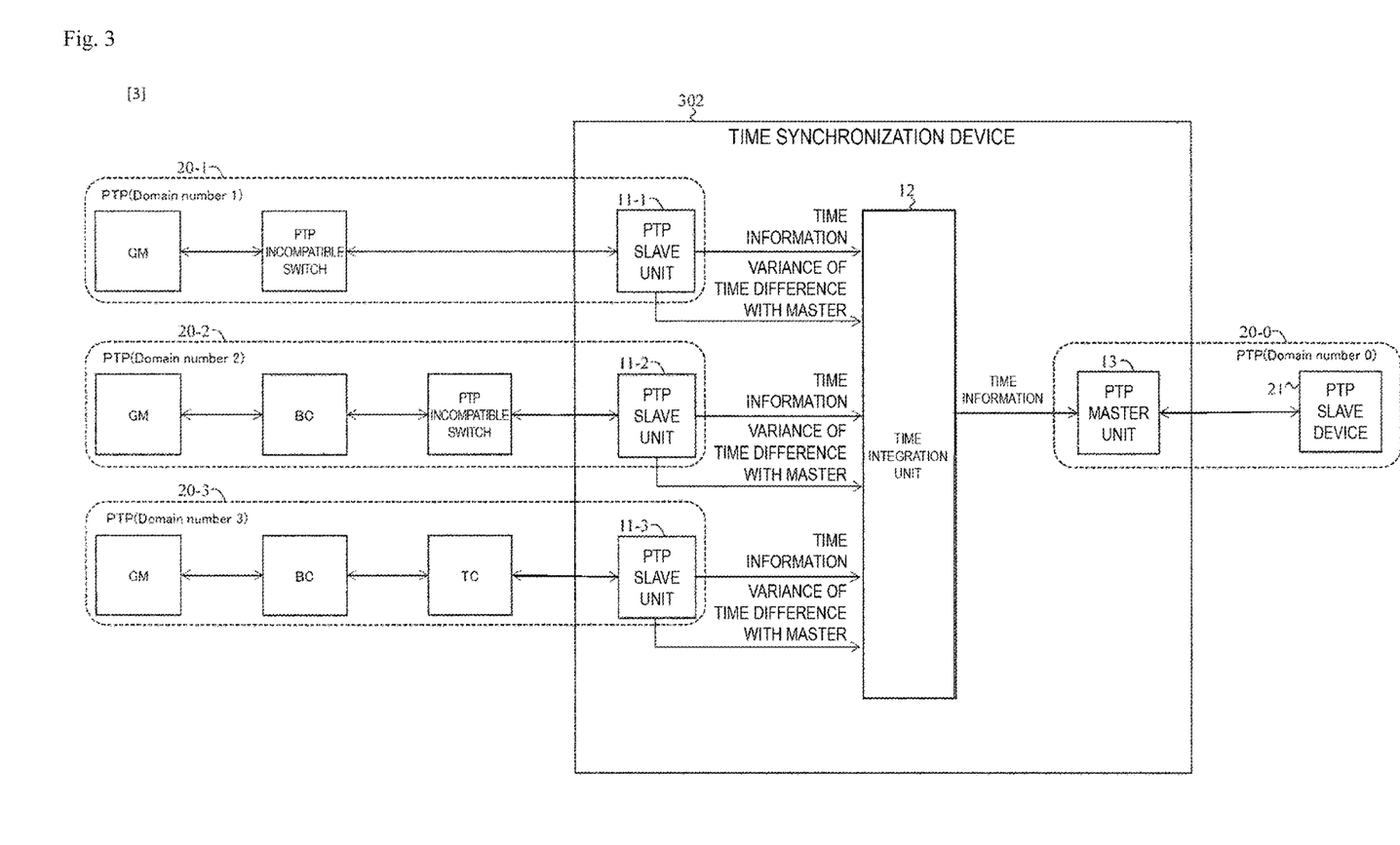
FIG. 3 is a diagram for describing the time synchronization device according to the present invention.

FIG. 3 is a diagram describing a time synchronization device 302 according to the present embodiment. The time synchronization device 302 further includes, in addition to the time synchronization device 301 in FIG. 2, a PTP master unit 13 that synchronizes, with the integrated time generated by the time integration unit 12, the time of a device 21 belonging to another PTP domain (20-0) different from the PTP domains (20-1 to 3) to which the PTP slave units (11-1 to 3) belong.

The time synchronization device 302 is a PTP relay device in which the PTP master unit 13 is added to the time synchronization device 301 in FIG. 2. Similar to the time synchronization device 301 in FIG. 2, the time synchronization device 302 uses a plurality of PTP domains (20-1 to 3) to generate an integrated time with high accuracy and supplies the integrated time to the PTP master unit 13.

The PTP master unit 13 synchronizes the subordinate PTP slave device 21 with the supplied integrated time. When the PTP master unit 13 redelivers the integrated time to the PTP slave device 21, the PTP master unit 13 sets the domain number to match the domain number used by the PTP slave device 21. The lower PTP slave device 21 synchronizing with the PTP master unit 13 may be a BC or a video transmission-reception terminal conforming to the SMPTE ST 2110. The SMPTE ST 2110 uses the PTP profile defined in the SMPTE ST 2059 to synchronize between terminals on the IP network.

Specific Examples

Figure 4:
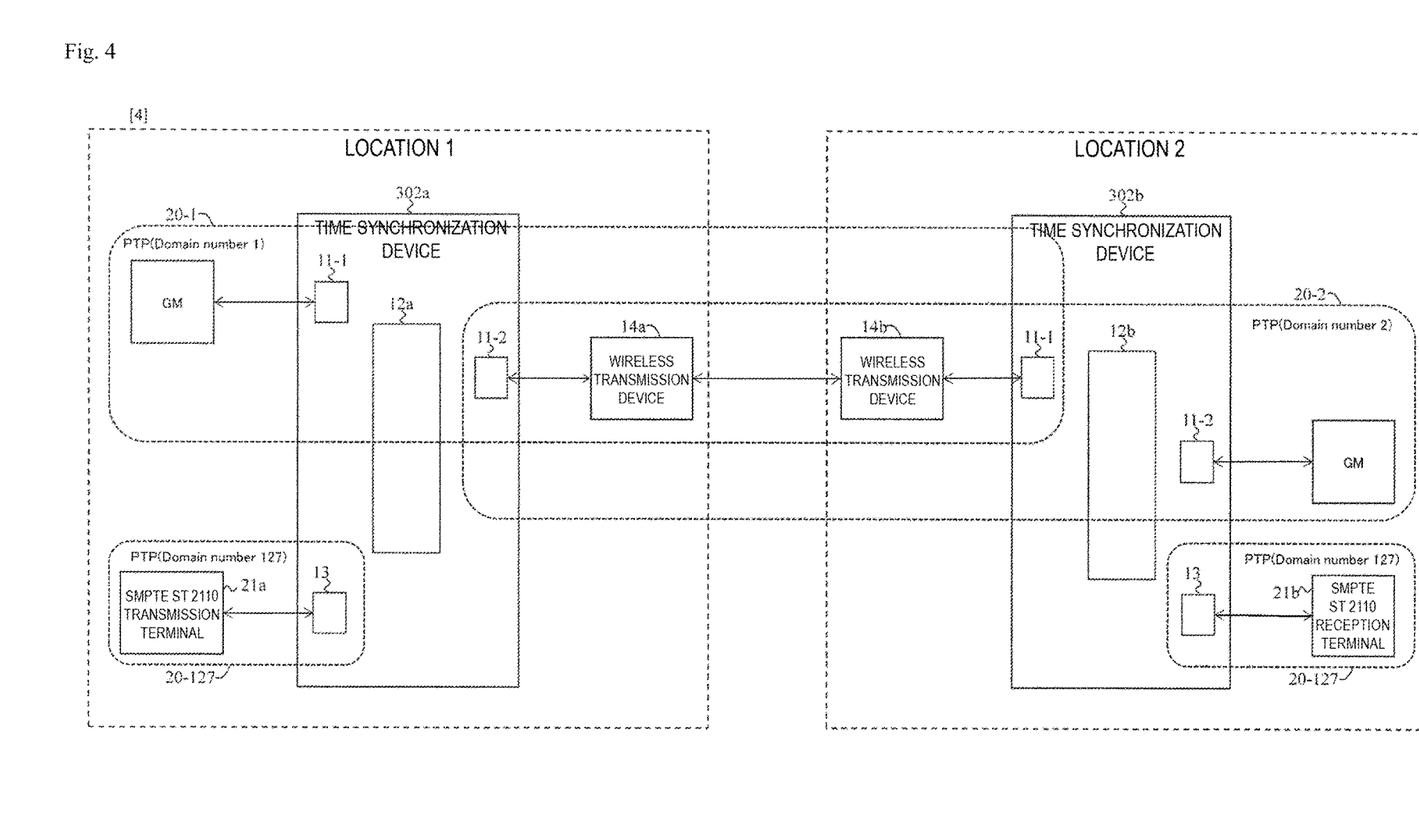
FIG. 4 is a diagram for describing the time synchronization device according to the present invention.

FIG. 4 is a diagram describing a specific transfer system using the time synchronization device 302. Location 1 and location 2 are connected by PTP incompatible wireless transmission devices (14a and 14b). Since the wireless transmission devices (14a and 14b) are PTP incompatible, it is not possible to compensate for delay jitter that occurs in wireless transmission devices. The GM at the location 1 operates within a domain number 1 and the GM at the location 2 operates within a domain number 2. The time source for both the GMs is a GPS. A transmission terminal 21a and a reception terminal 21b of the SMPTE ST 2110 use 127, which is a domain number specified in the SMPTE ST 2059.

The time synchronization device 302a at the location 1 synchronizes with both the domain numbers 1 and 2 (multiplexing of the PTP domain). The time integration unit 12a of the time synchronization device 302a compares synchronization accuracy information with respect to both the PTP domains (20-1 and 20-2). In a case where the domain number 1 that does not sandwich a radio segment is determined to be highly accurate, the time integration unit 12a delivers, with the Domain number 127, the time of the Domain number 1 as the integrated time to the ST 2110 transmission terminal 21a.

Similarly, the time synchronization device 302b at the location 2 also synchronizes with both the domain numbers 1 and 2. The time integration unit 12a of the time synchronization device 302b compares the synchronization accuracy of both the domains. When the domain number 2 that does not sandwich a radio segment is determined to be highly accurate, the time integration unit 12a delivers, with the Domain number 127, the time of Domain number 2 as the integrated time to the ST 2110 reception terminal 21b.

Third Embodiment

Figure 5:
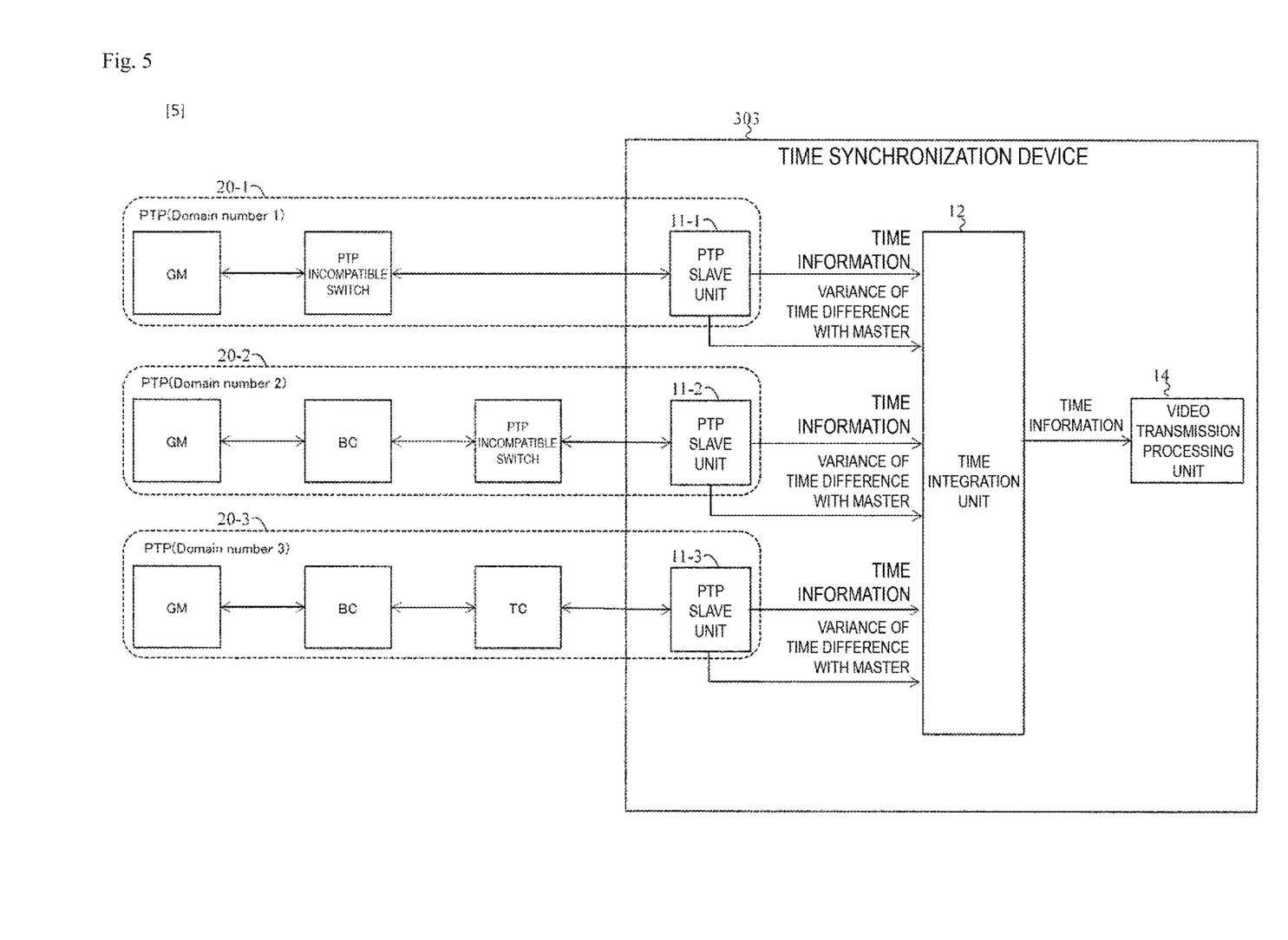
FIG. 5 is a diagram for describing the time synchronization device according to the present invention.

FIG. 5 is a diagram for describing a time synchronization device 305 according to the present embodiment. The time synchronization device 305 further includes a communication processing unit 14 that operates in synchronization with the integrated time generated by the time integration unit 12. The time synchronization device 302 in FIG. 3 synchronizes the externally connected device 21 with the integrated time. Because the time synchronization device 305 synchronizes the built-in communication processing unit 14 with the integrated time, the PTP master unit 13 is unnecessary.

FIG. 5 is an example in which the communication processing unit 14 is a video transmission processing unit conforming to the SMPTE ST 2110. The video transmission processing unit performs video transmission and reception processing in synchronization with the integrated time generated by the time integration unit 12.

Fourth Embodiment

The time synchronization device (301 to 303) can also be implemented by a computer and a program, and the program can be recorded in a recording medium or provided through a network.

Figure 6:
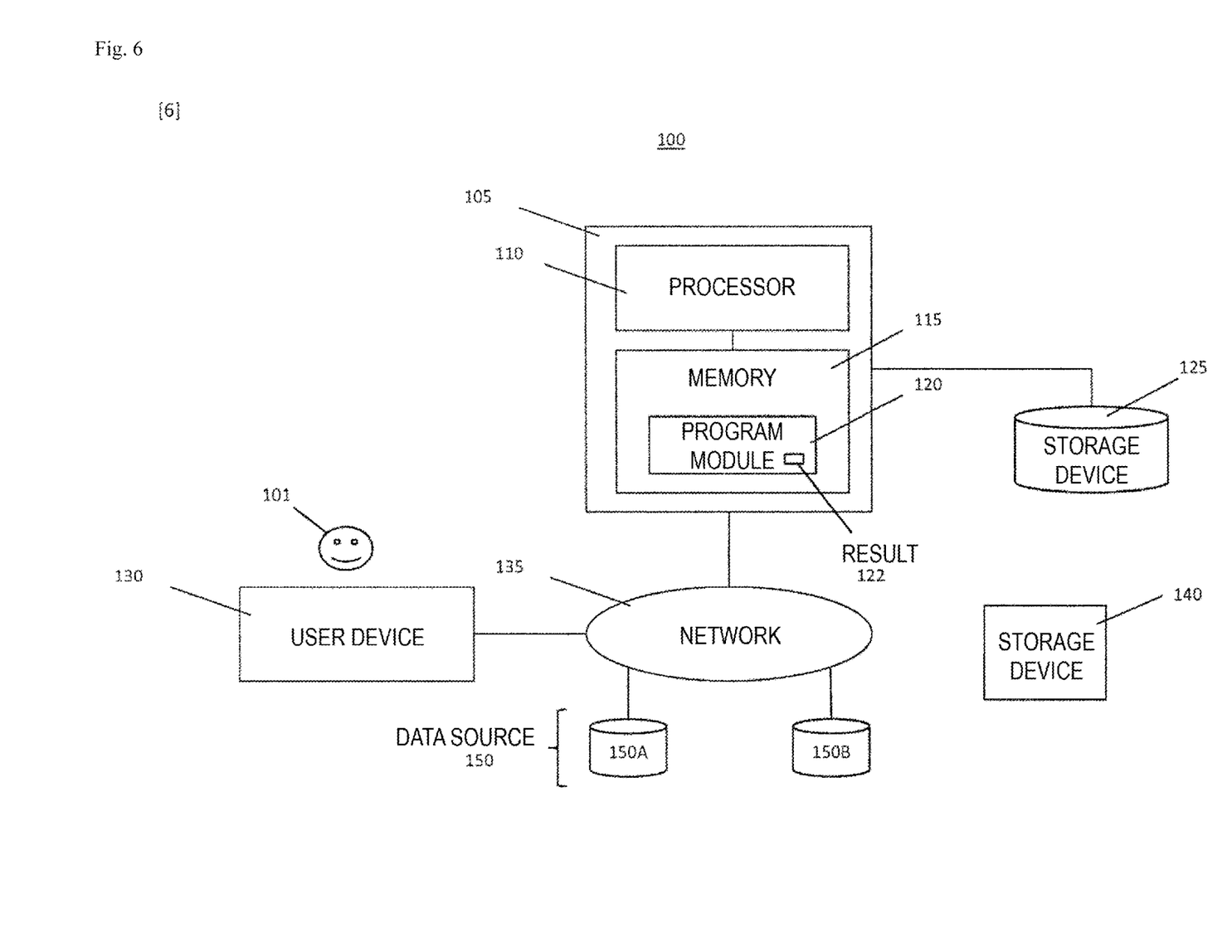
FIG. 6 is a diagram for describing the time synchronization device according to the present invention.

FIG. 6 illustrates a block diagram of a system 100 that is a time synchronization device (301 to 303). The system 100 includes a computer 105 connected to a network 135.

The network 135 is a data communication network. The network 135 may be a private network or a public network and can include any one or all of (a) a personal area network covering a certain room, for example, (b) a local area network covering a certain building, for example, (c) a campus area network covering a certain campus, for example, (d) a metropolitan area network covering a certain city, for example, (e) a wide area network covering areas that connect across boundaries of an urban area, a rural area, or a nation, for example, or (f) the Internet. The communication is performed by electronic signals and optical signals via the network 135.

The computer 105 includes a processor 110 and a memory 115 connected to the processor 110. Although the computer 105 is represented herein as a standalone device, it is not so limited, but rather may be connected to other devices not illustrated in a distributed processing system.

The processor 110 is an electronic device configured with logic circuit that responds to and executes instructions.

The memory 115 is a storage medium readable to a tangible computer with a computer program encoded therein. In this regard, the memory 115 stores data and instructions, that is program code, readable and executable by the processor 110 to control operation of the processor 110. The memory 115 can be implemented in a random access memory (RAM), a hard drive, a read-only memory (ROM), or a combination thereof. One of components of the memory 115 is a program module 120.

The program module 120 includes instructions for controlling the processor 110 to execute the processes described herein. Although operations are described herein as being performed by the computer 105 or a method or a process or a sub-process thereof, the operations are actually performed by the processor 110.

The term "module" is used herein to refer to a functional operation that can be embodied as either a stand-alone component or an integrated configuration of a plurality of lower components. Therefore, the program module 120 may be achieved as a single module or as a plurality of modules that operate in cooperation with each other. Moreover, while the program module 120 is described herein as being installed in the memory 115 and thus implemented in software, it is also possible to be implemented in any of hardware (for example, electronic circuit), firmware, software, or a combination thereof.

Although the program module 120 is illustrated as already being loaded into the memory 115, it may be configured to be located on a storage device 140 so as to be later loaded into the memory 115. The storage device 140 is a storage medium readable to a tangible computer storing the program module 120. Examples of the storage device 140 include a compact disc, a magnetic tape, a read-only memory, an optical storage media, a memory unit composed of a hard drive or a plurality of parallel hard drives, and a universal serial bus (USB) flash drive. Alternatively, the storage device 140 may be a random access memory or another type of electronic storage device that is located in a remote storage system not illustrated, and is connected to the computer 105 via the network 135.

The system 100 further includes a data source 150A and a data source 150B collectively referred to as a data source 150 herein and communicatively connected to the network 135. In practice, the data source 150 can include any number of data sources, that is, one or more data sources. The data source 150 can include unstructured data and include social media.

The system 100 further includes a user device 130 operated by a user 101 and connected to the computer 105 via the network 135. The user device 130 includes an input device, such as a keyboard or speech recognition subsystem, for enabling the user 101 to transmit information and a selection of command to the processor 110. The user device 130 further includes an output device, such as a display device or a printer or an audio synthesizer. A cursor control unit, such as a mouse, a trackball, or a touch sensitive screen, allows the user 101 to manipulate the cursor on the display device to transmit additional information and a selection of command to the processor 110.

The processor 110 outputs a result 122 of execution of the program module 120 to the user device 130. Alternatively, the processor 110 can provide output to a storage device 125, for example a database or a memory, or can provide output to a remote device not illustrated via the network 135.

For example, a program for causing a computer to operate as the time synchronization device according to any one of the first to third embodiments may be the program module 120. The system 100 can be operated as the time synchronization devices (301 to 303).

The terms "includes" or "including" specifies that features, integers, steps, or components described therein are present, but should be interpreted that they do not exclude the presence of one or more other features, integers, steps, or components, or groups thereof. The terms "a" and "an" are indefinite articles and therefore do not exclude embodiments having a plurality thereof.

Other Embodiments

Note that the present invention is not limited to the above-described embodiments, and can be variously modified and implemented within the scope not departing from the gist of the present invention. In short, the present invention is not limited to the higher-level embodiment as it is, and can be embodied, at the implementation stage, with the components modified within the scope not departing from the gist thereof.

Various inventions can be formed by appropriate combinations of a plurality of components disclosed in the above-described embodiments. For example, several components may be deleted from all of the components illustrated in the embodiments. Furthermore, components of different embodiments may be appropriately combined with each other.

Additional Description

The following describes a time synchronization device according to the present embodiment. The time synchronization device is a PTP slave device, and includes a plurality of slave units that synchronize with PTP domains different from each other, and a time integration unit that integrates time information based on time information and synchronization accuracy information of the plurality of slave units.

Effects of the Invention

According to the present invention, by using the time information from a plurality of available PTP domains, it is possible to obtain a PTP synchronization accuracy equal to or higher than that of using a single PTP domain. Further, it is also possible to respond to dynamic changes in network conditions, such as increased delay jitter for a particular link.

The time synchronization device of the second embodiment provides the effect that the subordinate PTP slave device does not need to synchronize with a plurality of PTP domains and can improve the synchronization accuracy by just continuing to participate in one PTP domain.

REFERENCE SIGNS LIST 11, 11-1, 11-2, 11-3: PTP slave unit
12, 12a, 12b: Time integration unit
13: PTP master unit
14a, 14b: Wireless transmission device
20, 20-1, 20-2, 20-3: PTP domain
21: Device
21a: Transmission terminal
21b: Reception terminal
100: System
101: User
105: Computer
110: Processor
115: Memory
120: Program module
122: Result
125: Storage device
130: User device
135: Network
140: Storage device
150: Data source
301 to 303: Time synchronization device

The invention claimed is:

1. A time synchronization device, comprising:
a plurality of precision time protocol (PTP) slave units, implemented using a computer, that are allocated to a plurality of corresponding domains and that are configured to synchronize with respective times of the plurality of corresponding domains, the plurality of corresponding domains being different from each other, and each domain having independent time management and being a PTP domain; and
a time integration unit, implemented using a computer, that is configured to use time information that is a time after a slave unit of the plurality of PTP slave units synchronizes with a time of a master device allocated to the corresponding domain and synchronization accuracy information that is an accuracy of synchronization of the slave unit with the time of the master device to generate a single integrated time.

2. The time synchronization device according to claim 1, wherein the master device implemented using a computer, is configured to synchronize a time of a device allocated to another domain different from the domain to which the slave unit is allocated, with the integrated time generated by the time integration unit.

3. The time synchronization device according to claim 1, further comprising:

a communication processing unit, implemented using a computer, configured to:
  operate in synchronization with the integrated time generated by the time integration unit, and
  synchronize an external device with the integrated time.

4. The time synchronization device according to claim 1, wherein a variance of a time difference between time calibrated in the slave unit and the master device is used as the synchronization accuracy information.

5. The time synchronization device according to claim 4, wherein the time integration unit is configured to employ a time of a domain, among the plurality of corresponding domains, having a smallest variance of the time difference as the single integrated time.

6. The time synchronization device according to claim 1, further comprising a PTP master unit configured to synchronize a subordinate PTP slave device with the single integrated time.

7. A time synchronization method, comprising:
  synchronizing, by a plurality of precision time protocol (PTP) slave units that are allocated to a plurality of corresponding domains with respective times of the plurality of corresponding domains, the plurality of corresponding domains being different from each other, and each domain having independent time management and being a PTP domain; and
  using time information that is a time after a slave unit of the plurality of PTP slave units synchronizes with a time of a master device allocated to the corresponding domain and synchronization accuracy information that is an accuracy of synchronization of the slave unit with the time of the master device to generate a single integrated time.

8. The time synchronization method according to claim 7, further comprising synchronizing a time of a device allocated to another domain different from the domain to which the slave unit is allocated, with the generated integrated time.

9. The time synchronization method according to claim 7, further comprising operating in synchronization with the generated integrated time by synchronizing an external device with the generated integrated time.

10. The time synchronization method according to claim 7, wherein a variance of a time difference between time calibrated in the slave unit and the master device is used as the synchronization accuracy information.

11. The time synchronization method according to claim 10, further comprising employing a time of a domain, among the plurality of corresponding domains, having a smallest variance of the time difference as the single integrated time.

12. The time synchronization method according to claim 7, further comprising synchronizing a subordinate PTP slave device with the single integrated time.

13. A non-transitory recording medium storing a program, wherein execution of the program causes one or more computers to perform operations comprising:
  synchronizing, by a plurality of precision time protocol (PTP) slave units allocated to a plurality of corresponding domains with respective times of the plurality of corresponding domains, the plurality of corresponding domains being different from each other, and each domain having independent time management and being a PTP domain; and
  using time information that is a time after a slave unit of the plurality of PTP slave units synchronizes with a time of a master device allocated to the corresponding domain and synchronization accuracy information that is an accuracy of synchronization of the slave unit with the time of the master device main to generate a single integrated time.

14. The non-transitory recording medium according to claim 13, wherein the operations further comprise synchronizing a time of a device allocated to another domain different from the domain to which the slave unit is allocated, with the generated integrated time.

15. The non-transitory recording medium according to claim 13, wherein the operations further comprise:
  operating in synchronization with the generated integrated time by synchronizing an external device with the generated integrated time the time integration unit.

16. The non-transitory recording medium according to claim 13, wherein a variance of a time difference between time calibrated in the slave unit and the master device is used as the synchronization accuracy information.

17. The non-transitory recording medium according to claim 16, wherein the operations further comprise employing a time of a domain, among the plurality of corresponding domains, having a smallest variance of the time difference as the single integrated time.

18. The non-transitory recording medium according to claim 13, wherein the operations further comprise synchronizing a subordinate PTP slave device with the single integrated time.

* * * * *